United States Patent
Moon et al.

(10) Patent No.: US 6,722,143 B2
(45) Date of Patent: Apr. 20, 2004

(54) AIR CONDITIONING APPARATUS AND CONTROL METHOD THEREOF

(75) Inventors: Je-Myoung Moon, Suwon (KR); Jong-Youb Kim, Suwon (KR); Dong-Kue Lee, Pyungtak (KR); Il-Yong Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/305,177

(22) Filed: Nov. 27, 2002

(65) Prior Publication Data

US 2003/0230099 A1 Dec. 18, 2003

(30) Foreign Application Priority Data

Jun. 14, 2002 (KR) ........................................ 2002-33223

(51) Int. Cl.[7] ................................................ F25B 7/00
(52) U.S. Cl. .......................................... 62/175; 62/510
(58) Field of Search ............................... 62/175, 228.4, 62/228.5, 510, 192, 199, 193, 410

(56) References Cited

U.S. PATENT DOCUMENTS

| | | | | |
|---|---|---|---|---|
| 4,383,802 A | * | 5/1983 | Gianni et al. ................. | 417/12 |
| 4,628,700 A | * | 12/1986 | Alsenz ........................ | 62/152 |
| 4,870,831 A | * | 10/1989 | Kitamoto ..................... | 62/84 |
| 4,876,859 A | * | 10/1989 | Kitamoto ..................... | 62/117 |
| 5,050,397 A | * | 9/1991 | Sugiyama et al. ............ | 62/175 |
| 5,735,139 A | * | 4/1998 | Lord et al. ................... | 62/470 |
| 6,018,957 A | * | 2/2000 | Katra et al. .................. | 62/175 |
| 6,394,120 B1 | | 5/2002 | Wichert | |
| 6,401,469 B1 | | 6/2002 | Dennis et al. | |

OTHER PUBLICATIONS

U.S. patent application Ser. No. 10/305,176, Je–Myoung Moon, et al., filed Nov. 27, 2002, Samsung Electronics Co., Ltd.

U.S. patent application Ser. No. 10/305,177, Je–Myoung Moon, et al., filed Nov. 27, 2002, Samsung Electronics Co., Ltd.

* cited by examiner

Primary Examiner—Marc Norman
(74) Attorney, Agent, or Firm—Staas & Halsey LLP

(57) ABSTRACT

An air conditioning apparatus and control method thereof is provided, in which two-stage variable-capacity compressors are connected in parallel with each other to control capacities of the two stage variable-capacity compressors according to indoor air conditioning loads. A pair of two-stage variable-capacity compressors are used in the air conditioning apparatus to be cost competitive and can obtain an effect in which the pair of two-stage variable-capacity compressors are controlled as if a large-scale variable-capacity compressor with a capacity the same as a total capacity of the two compressors were linearly controlled.

23 Claims, 7 Drawing Sheets

AIR CONDITIONING APPARATUS AND CONTROL METHOD THEREOF

CROSS-REFERENCE TO RELATED APPLICATION

This application claims the benefit of Korean Application No. 2002-33223, filed Jun. 14, 2002, in the Korean Industrial Property Office, the disclosure of which is incorporated herein by reference.

BACKGROUND OF THE INVENTION

1. Field of the Invention

The present invention relates generally to an air conditioning apparatus and control method thereof, in which two-stage variable-capacity compressors are connected in parallel with each other.

2. Description of the Related Art

Generally, a single air conditioning apparatus in which one indoor unit is connected to one outdoor unit does not have a large indoor air conditioning load (required capacity), so a fixed-capacity compressor is installed in the outdoor unit.

On the contrary, a multi-unit air conditioning apparatus in which a plurality of indoor units are connected to one outdoor unit is designed such that each of the indoor units independently copes with an air conditioning load of a corresponding indoor space. In such a multi-unit air conditioning apparatus, since air conditioning loads of respect indoor units are different and vary at any time, a variable-capacity compressor is installed in an outdoor unit, and a flow of refrigerant is controlled by ascertaining loads and operating states using communication between each the of indoor units and the outdoor unit. Further, the variable-capacity compressor is controlled by a microcomputer of the outdoor unit. The outdoor unit microcomputer checks the air conditioning requirements with respect to a corresponding indoor space, a temperature condition of the corresponding indoor space, etc. based on information received from each of the indoor units, and controls a capacity of the compressor according to the checked information.

However, since a conventional multi-unit air conditioning apparatus employs a construction in which a plurality of indoor units are connected to one outdoor unit, a compressor installed in the outdoor unit must be designed to endure a maximum indoor air conditioning load. Further, in order for a compressor to endure the maximum indoor air conditioning load, significant difficulty arises in the production of the compressor. That is, a plurality of performance tests must be carried out so as to increase the capacity of the compressor.

A high-capacity compressor produced by the above process is problematic in that the high-capacity compressor is very expensive, relative to a conventional compressor.

In the prior art, a manner in which a variable-capacity compressor and a fixed-capacity compressor are mixed to cope with indoor air conditioning loads is used in consideration of the above problem.

As shown in FIG. 1, a compressor 10, which operates at a capacity varied according to a frequency of an inverter circuit, and a fixed-capacity compressor 20, which operates at a constant capacity, are connected in parallel with each other. Further, an outdoor unit microcomputer (not shown) controls capacities of the variable-capacity compressor 10 and the fixed-capacity compressor 20 according to indoor air conditioning loads (required capacities) received from respective indoor units. Referring to FIG. 2, if the indoor air conditioning loads are 0% to 50%, the outdoor unit microcomputer controls the capacity of the variable-capacity compressor 10. In this case, the microcomputer controls the capacity of the variable-capacity compressor 10 by varying a frequency outputted to the variable-capacity compressor 10 from an inverter circuit within a predetermined range R1 according to the indoor air conditioning loads (required capacities) received from the respect indoor units. Further, if the indoor air conditioning loads are 50% to 100%, the outdoor unit microcomputer controls the capacities of the variable-capacity compressor 10 and fixed-capacity compressor 20. In this case, the microcomputer copes with an insufficient capacity by controlling the capacity of the inverter-type variable-capacity compressor 10 operated according to a frequency of the inverter circuit within a predetermined range R2 after activating the fixed capacity compressor 20.

However, if the conventional air conditioning apparatus is used for facilities such as large buildings, a capacity, which must be provided by a variable-capacity compressor, inevitably becomes large. Further, to produce such a high-capacity compressor as an independent device is difficult and expensive, even though an independent device can be produced, thus causing an economic burden by increasing a price of the compressor.

Therefore, in the multi-unit air conditioning apparatus, a method is required of effectively coping with a large-scale indoor air conditioning load (required capacity). Further, a method of accommodating requirements for the large-scale air conditioning capacity while using a conventional compressor is seriously required.

SUMMARY OF THE INVENTION

Accordingly, an air conditioning apparatus and control method thereof is provided, in which two-stage variable-capacity compressors are connected in parallel with each other to cope with indoor air conditioning loads, thus realizing the compressors at a low price.

Additional aspects and advantages of the invention will be set forth in part in the description which follows and, in part, will be obvious from the description, or may be learned by practice of the invention.

In order to accomplish the above and other aspects, an air conditioning apparatus is provided, comprising a first compressor controlled to operate at one of a first minimum capacity and a first maximum capacity; a second compressor connected in parallel with the first compressor and controlled to operate at one of a second minimum capacity and a second maximum capacity; and a control unit controlling the capacities of the first and second compressors such that a total capacity of the first and second compressors is controlled in multiple stages according to indoor air conditioning loads.

Further, an air conditioning apparatus, comprising a plurality of indoor units; and an outdoor unit connected to the plurality of indoor units is provided, comprising a first compressor controlled to operate at one of a first minimum capacity and a first maximum capacity, a second compressor connected in parallel with the first compressor and controlled to operate at one of a second minimum capacity and a second maximum capacity, and an outdoor control unit controlling the capacities of the first and second compressors such that a total capacity of the first and second compressors is controlled in multiple stages according to indoor air conditioning loads required by the indoor units.

Further, a method of controlling an air conditioning apparatus, the air conditioning apparatus is provided having a plurality of indoor units connected to an outdoor unit comprising a first compressor operating at one of a first minimum capacity and a first maximum capacity, and a second compressor for operating at one of a second minimum capacity and a second maximum capacity, comprising calculating an air conditioning capacity required by corresponding indoor units; and controlling the capacities of the first and second compressors such that a total capacity of the first and second compressors is controlled in multiple stages according to the calculated required air conditioning capacity, wherein the first maximum capacity of the first compressor is equal to the second minimum capacity of the second compressor, and the second maximum capacity of the second compressor is two times greater than the second minimum capacity of the second compressor.

The air conditioning apparatus uses a pair of two-stage variable-capacity compressors connected in parallel with each other, wherein each of the two-stage variable-capacity compressors operates at two different capacities. One of the compressors operates at a first minimum capacity and a first maximum capacity, and the other operates at a second minimum capacity and a second maximum capacity. In this case, the first maximum capacity is equal to the second minimum capacity and corresponds to a half of the second maximum capacity.

BRIEF DESCRIPTION OF THE DRAWINGS

These and other aspects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
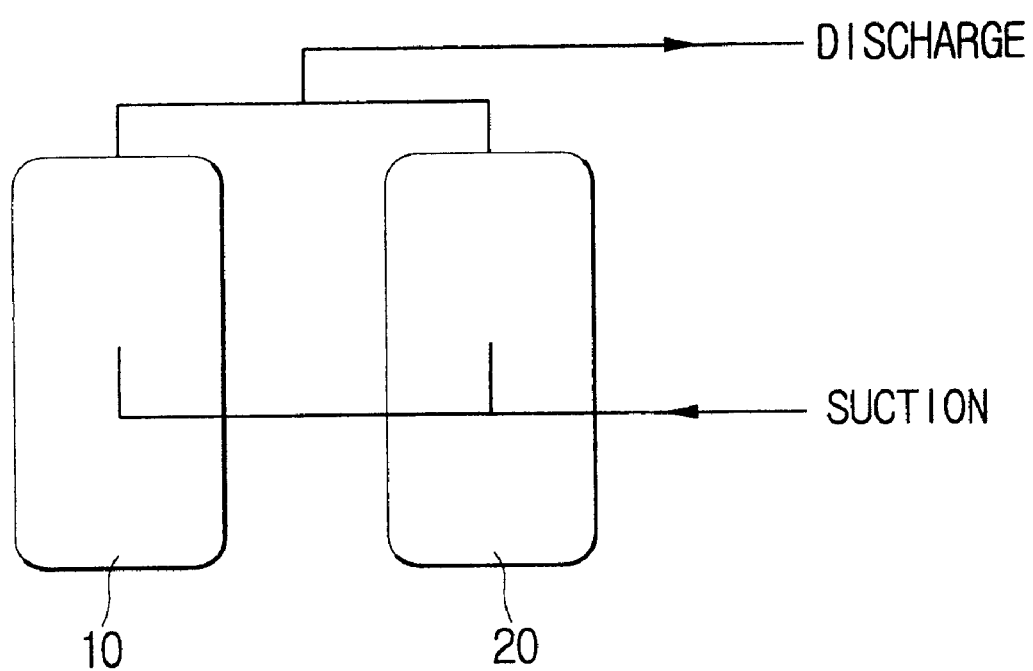
FIG. 1 is a view showing a construction of a conventional air conditioning apparatus in which a variable-capacity compressor and a fixed-capacity compressor are connected in parallel with each other.
Figure 2:
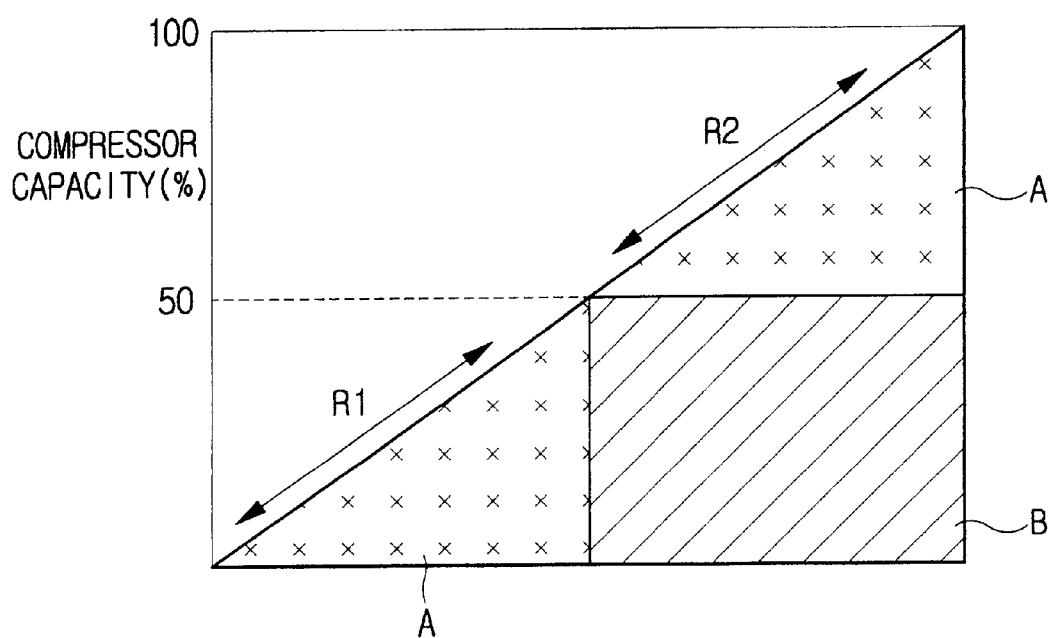
FIG. 2 is a graph showing an operation of controlling capacities of the compressors of FIG. 1.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Figure 3:
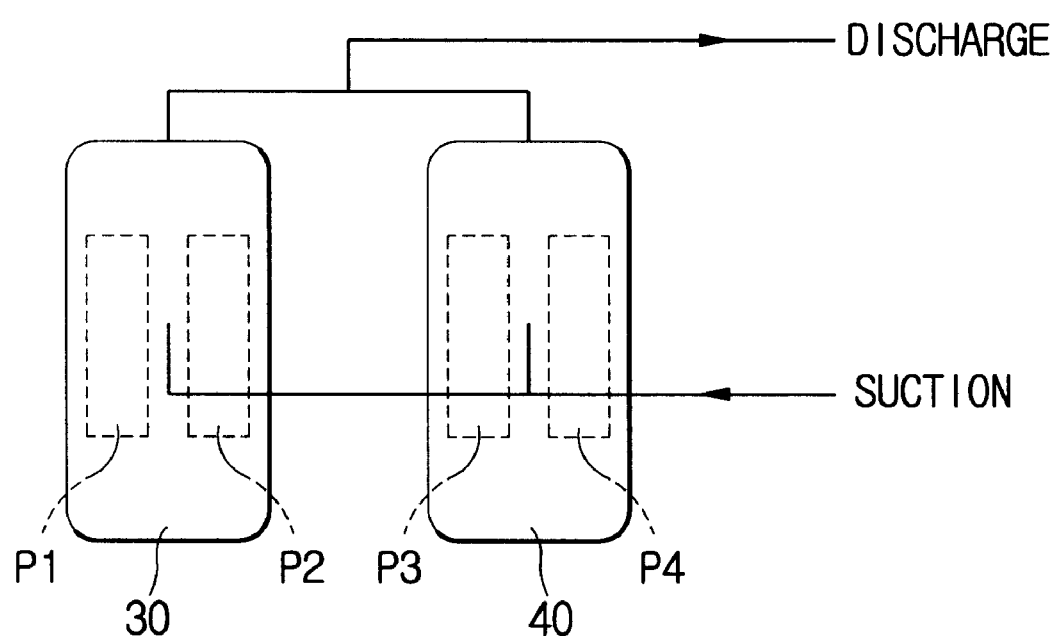
FIG. 3 is a view showing a construction of an air conditioning apparatus in which two-stage variable-capacity compressors are connected in parallel with each other according to an embodiment of the present invention.

FIG. 3 is a view showing a construction in which of an air conditioning apparatus in which two-stage variable-capacity compressors are connected in parallel with each other according to an embodiment of the present invention.

Figure 7:
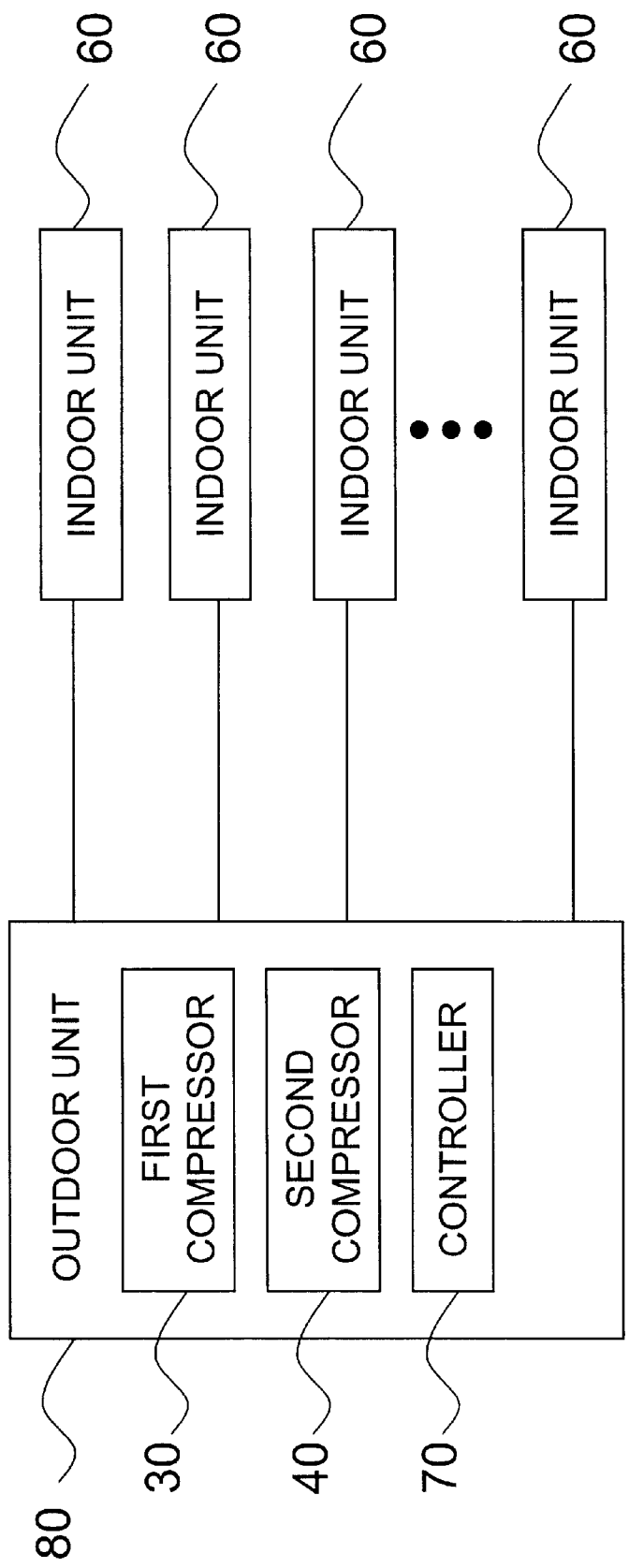
FIG. 7 is a block diagram showing a multi-unit air conditioning according to the embodiment of the present invention.

As shown in FIG. 3, the air conditioning apparatus comprises two compressors 30 and 40 connected in parallel with each other. The compressors 30 and 40 can be applied to a multi-unit air conditioning apparatus, as shown in FIG. 7, in which a plurality of indoor units 60 are connected to one outdoor unit 80. In this case, the compressors 30 and 40 are installed in the outdoor unit 80, and the capacities of the compressors 30 and 40 are under the control of an outdoor unit controller 70 (i.e., a microcomputer).

The first and second compressors 30 and 40 compress refrigerant using a common method, wherein a capacity supplied by the second compressor 40 is almost two times a capacity of the first compressor 30.

The first compressor 30 is a two-stage variable-capacity compressor which has two compressing rooms P1 and P2 therein. If a motor in the first compressor 30 rotates in a forward direction according to a control instruction of an outdoor unit controller 70, both the compressing rooms P1 and P2 perform compression of refrigerant, so the first compressor 30 is operated at 100% capacity, which is a first maximum capacity. Alternatively, if the motor in the first compressor 30 rotates in a reverse direction according to a control instruction of the outdoor unit 80 microcomputer, any one of the two compressing rooms P1 and P2 may perform the compression of refrigerant, so the first compressor 30 is operated at 50% capacity, which is a first minimum capacity.

The second compressor 40 is a two-stage variable-capacity compressor which has two compressing rooms P3 and P4 therein. If a motor in the second compressor 40 rotates in the forward direction according to the control instruction of the outdoor unit controller 70, both of the compressing rooms P3 and P4 perform the compression of refrigerant, so the second compressor 40 is operated at 100% capacity, which is a second maximum capacity. Alternatively, if the motor in the second compressor 40 rotates in the reverse direction according to the control instruction of the outdoor unit controller 70, any one of the two compressing rooms P3 and P4 may perform the compression of refrigerant, so the second compressor 40 is operated at 50% capacity, which is a second minimum capacity.

As described above, each of the first and second compressors 30 and 40 operates at one of two different capacities either a minimum capacity or a maximum capacity determined by the outdoor unit controller 70. It is further understood that additional compressors can be added to add more capacities as needed, which operates with a total capacity characteristic which is piece-wise linear.

The first maximum capacity of the first compressor 30 is equal to the second minimum capacity of the second compressor 40, and corresponds to a half of the second maximum capacity.

A device to keep oil supplied to the first and second compressors 30 and 40 with different capacities may be provided. An oil equalization tube B may be employed, as shown in FIG. 4.

Figure 4:
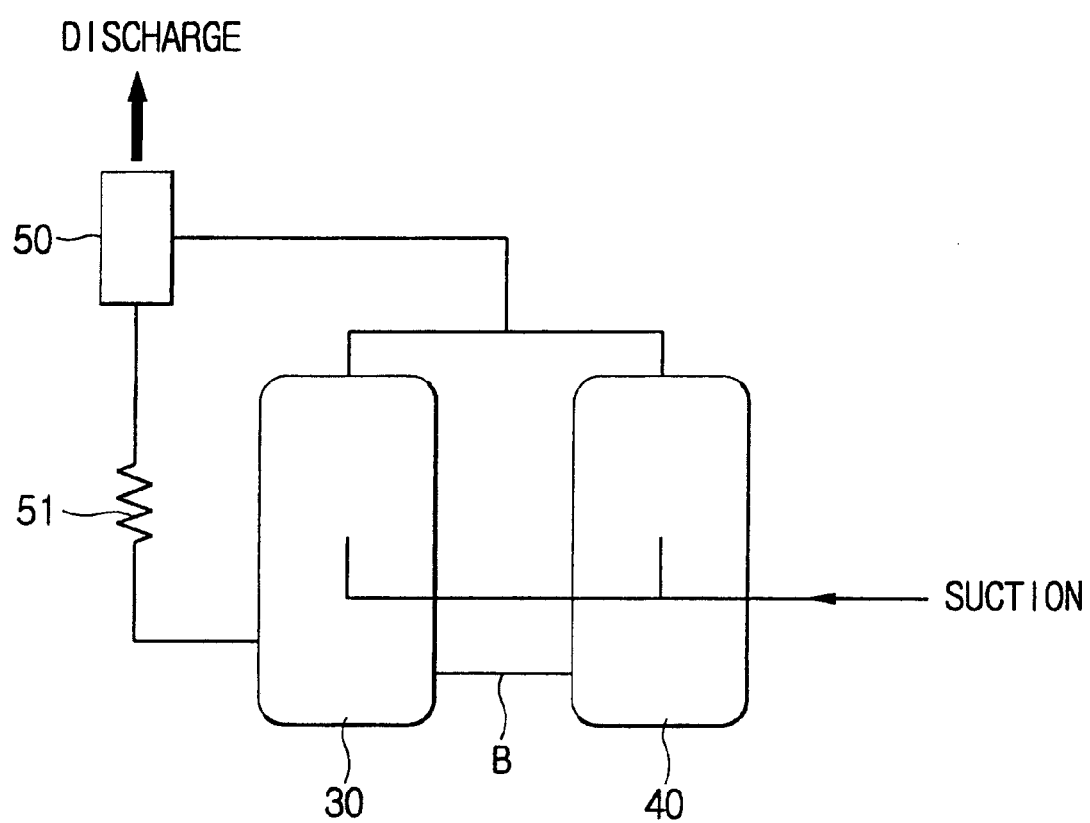
FIG. 4 is a view showing a construction in which an oil equalization tube is connected to the compressors according to the embodiment of the present invention.

As shown in FIG. 4, an oil separator 50 is arranged in discharge sides of the first and second compressors 30 and 40 to separate refrigerant and oil. A capillary tube 51 is disposed between the first compressor 30 and the oil separator 50. Further, the oil equalization tube B is disposed between the first and second compressors 30 and 40 to connect an oil storing room of the first compressor 30 with an oil storing room of the second compressor 40.

Oil separated from the refrigerant by the oil separator 50 returns to the first compressor 30 through the oil equalization tube B. In this case, an additional oil equalizing operation is not performed.

Figure 5:
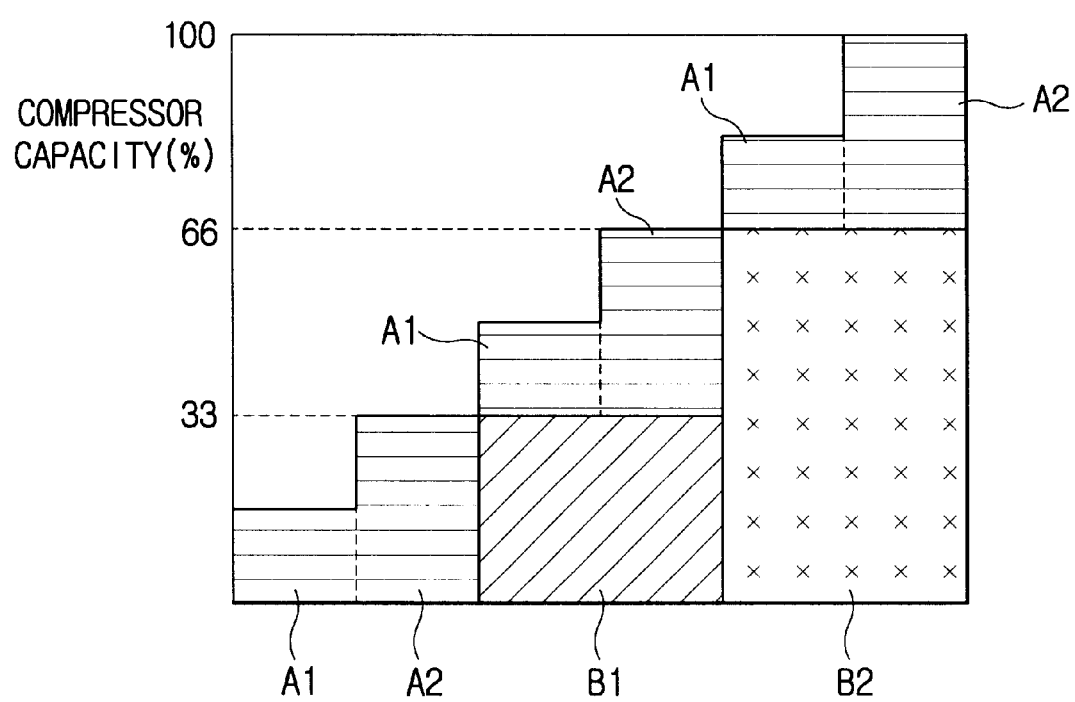
FIG. 5 is a graph showing the operation of controlling capacities of the compressors according to a second embodiment of the present invention.
Figure 6:
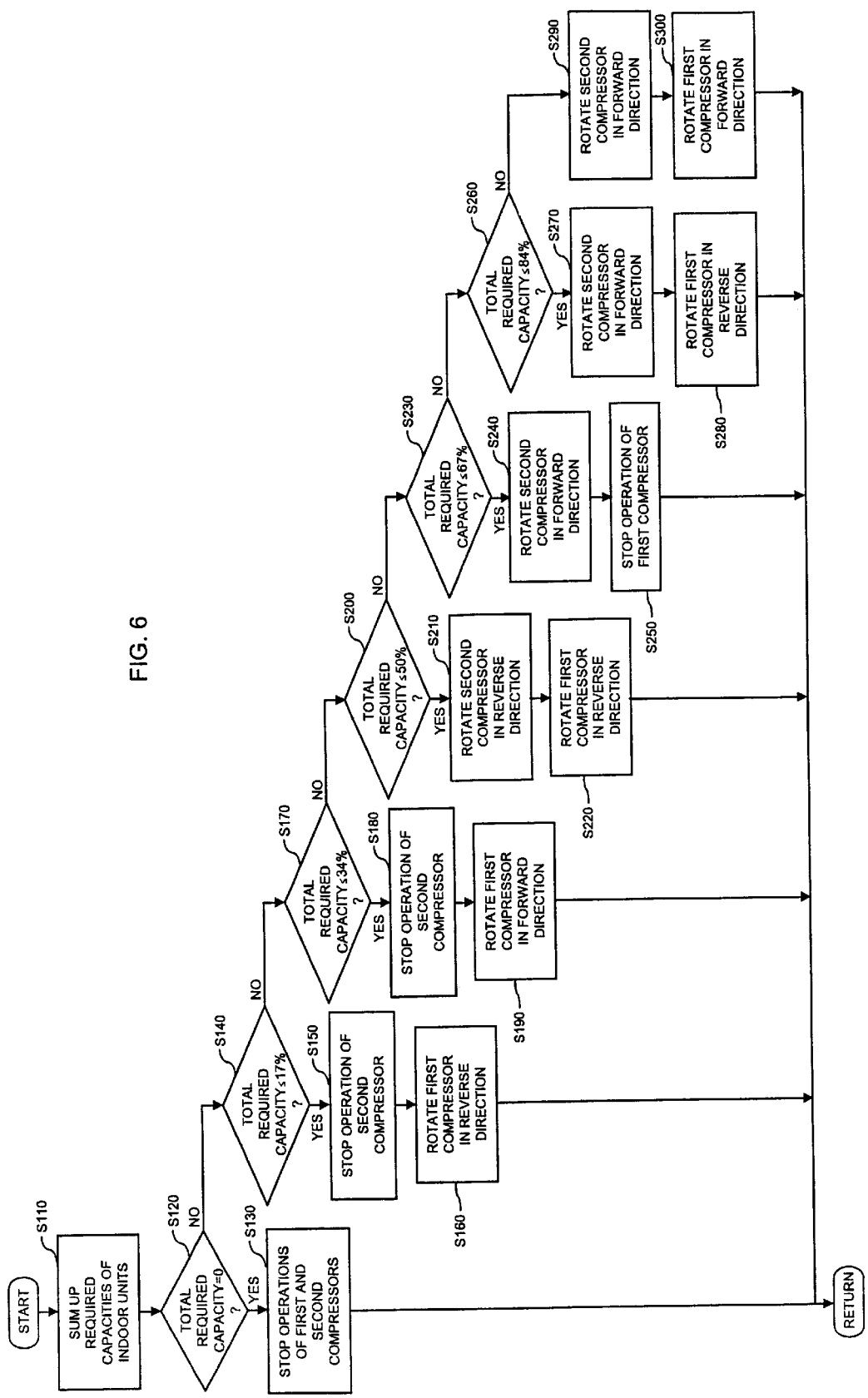
FIG. 6 is a flowchart of a method of controlling the air conditioning apparatus according to the second embodiment of the present invention.

Hereinafter, the operation of the air conditioning apparatus and control method thereof according to the present invention is described in detail with reference to FIGS. 5 and 6.

The air conditioning apparatus is applied to a multi-unit air conditioning apparatus in which an indoor air conditioning load may be greatly varied. In this case, the multi-unit air conditioning apparatus is described, in which a plurality of indoor units 60 are connected to one outdoor unit 80, the indoor units 60 and the outdoor unit 80 mutually communicate with each other, and an outdoor unit controller 70 controlling several compressors 30, 40 installed in the outdoor unit 80 controls capacities of the compressors 30, 40 according to indoor air conditioning loads (required capacities) received from respective indoor units 60.

First, the outdoor unit microcomputer calculates a total indoor air conditioning load (required capacity) by summing up the air conditioning loads received from corresponding indoor units 60 of the plural indoor units 60 at operation S110.

Then, the outdoor unit controller 70 determines whether the calculated total required capacity is 0 at operation S120. If the total required capacity is 0, the outdoor unit controller 70 stops operations of both the first and second compressors 30 and 40 at operation S130.

If the total required capacity is not 0 at operation S120, the outdoor unit controller 70 determines whether the total required capacity is equal to or less than 17% of a total capacity of the compressors 30, 40 at operation S140. If the total required capacity is equal to or less than 17% of the total capacity of the compressors 30, 40, the microcomputer stops the operation of the second compressor 40, and operates the first compressor 30 to rotate in a reverse direction so as to allow the first compressor 30 to operate at the first minimum capacity (with reference to A1 of FIG. 5) at operations S150 and S160.

If the total required capacity is greater than 17% of the total capacity of the compressors 30, 40 at operation S140, the outdoor unit controller 70 determines whether the total required capacity is less than or equal to 34% of the total capacity of the compressors at S170. If the total required capacity is less than or equal to 34% of the total capacity of the compressors 30, 40, the outdoor unit controller 70 stops the operation of the second compressor 40, and operates the first compressor 30 to rotate in a forward direction so as to allow the first compressor 30 to operate at the first maximum capacity (with reference to A2 of FIG. 5) at operations S180 and S190.

If the total required capacity is greater than 34% of the total capacity of the compressors 30, 40 at S170, the outdoor unit controller 70 determines whether the total required capacity is less than or equal to 50% of the total capacity of the compressors 30, 40 at operation S200. If the total required capacity is less than or equal to 50% of the total capacity of the compressors 30, 40, the outdoor unit controller 70 operates the second compressor 40 to rotate in the reverse direction so as to allow the second compressor 40 to operate at the second minimum capacity, and to operates the first compressor 30 to rotate in the reverse direction so as to allow the first compressor 30 to operate at the first minimum capacity (with reference to A1 and B1 of FIG. 5) at operations S210 and S220.

If the total required capacity is greater than 50% of the total capacity of the compressors 30, 40 at operation S200, the outdoor unit controller 70 determines whether the total required capacity is less than or equal to 67% of the total capacity of the compressors 30, 40 at operation S230. If the total required capacity is less than or equal to 67% of the total capacity of the compressors 30, 40, the microcomputer operates the second compressor 40 to rotate in the forward direction so as to allow the second compressor 40 to operate at the second maximum capacity, and stops the operation of the first compressor 30 (with reference to B2 of FIG. 5) at operations S240 and S250.

If the total required capacity is greater than 67% of the total capacity of the compressors 30, 40 at operation S230, the outdoor unit controller 70 determines whether the total required capacity is less than or equal to 84% of the total capacity of the compressors 30, 40 at operation S260. If the total required capacity is less than or equal to 84% of the total capacity of the compressors 30, 40, the microcomputer operates the second compressor 40 to rotate in the forward direction so as to allow the second compressor 40 to operate at the second maximum capacity, and to operate the first compressor 30 to rotate in the reverse direction so as to allow the first compressor 30 to operate at the first minimum capacity (with reference to A1 and B2 of FIG. 5) at operations S270 and S280.

If the total required capacity is greater than 84% of the total capacity of the compressors 30, 40 at operation S260, the outdoor unit controller 70 operates both the second compressor 40 and the first compressor 30 to rotate in the forward direction so as to allow the second compressor 40 and the first compressor 30 to operate at the second maximum capacity and the first maximum capacity, respectively (with reference to A2 and B2 of FIG. 5) at operations S290 and S300.

After the operations S130, S160, S190, S220, S250, S280, and S300 are performed, a processing operation returns to a start.

As described above, an air conditioning apparatus and control method thereof is provided, in which a two-stage variable-capacity compressor with large capacity and a two-stage variable-capacity compressor with small capacity are connected in parallel with each other, thus enabling the capacities of the compressors to be controlled in multiple stages according to indoor air conditioning loads. Further, the air conditioning apparatus advantageously employs two-stage variable-capacity compressors, which are inexpensive compared with a linear variable-capacity compressor, thus reducing a cost of the air conditioning apparatus. Further, a high operating efficiency advantageously can be obtained over entire operating areas because the two-stage variable-capacity compressor is higher than the linear variable-capacity compressor in operating efficiency. It is understood that additional compressors can be used, and that the micro controller can be a computer implementing the control method which is programmed on a computer readable medium or in firmware.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An air conditioning apparatus, comprising:
   a first compressor controlled to operate at one of a non-zero first minimum capacity and a first maximum capacity;

a second compressor connected in parallel with the first compressor and controlled to operate at one of a non-zero second minimum capacity and a second maximum capacity; and a control unit controlling the first and second compressors such that a total capacity of the first and second compressors is controlled in multiple stages according to indoor air conditioning loads.

2. The air conditioning apparatus according to claim 1, wherein the first maximum capacity of the first compressor is substantially equal to the second minimum capacity of the second compressor, and the second maximum capacity of the second compressor is about two times or more the second minimum capacity of the second compressor.

3. The air conditioning apparatus according to claim 1, wherein each respective compressor of the first and second compressors has two compressing rooms therein, operates at a maximum capacity by enabling both the respective compressing rooms to perform compression if the respective compressor rotates in a forward direction, and operates at a minimum capacity by enabling one of the two respective compressing rooms to perform the compression if the respective compressor rotates in a reverse direction.

4. The air conditioning apparatus according to claim 1, further comprising:
an oil equalization tube connecting the first compressor with the second compressor so as to supply oil to the first and second compressors.

5. An air conditioning apparatus, comprising:
a plurality of indoor units; and
an outdoor unit connected to the plurality of indoor units, comprising,
a first compressor controlled to operate at one of a non-zero first minimum capacity and a first maximum capacity,
a second compressor connected in parallel with the first compressor and controlled to operate at one of a non-zero second minimum capacity and a second maximum capacity, and
an outdoor control unit controlling the first and second compressors such that a total capacity of the first and second compressors is controlled in multiple stages according to indoor air conditioning loads required by the plurality of the indoor units.

6. A method of controlling an air conditioning apparatus, the air conditioning apparatus having a plurality of indoor units connected to an outdoor unit comprising a first compressor operating at one of a first minimum capacity and a first maximum capacity, and a second compressor operating at one of a second minimum capacity and a second maximum capacity, the method comprising:
calculating an air conditioning capacity required by corresponding indoor units; and
controlling capacities of the first and second compressors such that a total capacity of the first and second compressors is controlled in multiple stages according to the calculated air conditioning capacity,
wherein the first maximum capacity of the first compressor is substantially equal to the second minimum capacity of the second compressor, and the second maximum capacity of the second compressor is about two times or more the second minimum capacity of the second compressor.

7. The control method of the air conditioning apparatus, according to claim 6, wherein said controlling comprises:
stopping operations of the first and second compressors, if the calculated air conditioning capacity is 0;

stopping an operation of the second compressor and allowing the first compressor to operate at the first minimum capacity, if the calculated air conditioning capacity is greater than 0 and is less than or equal to the first minimum capacity of the first compressor;

stopping an operation of the second compressor and allowing the first compressor to operate at the first maximum capacity, if the calculated air conditioning capacity is greater than the first minimum capacity of the first compressor and is less than or equal to the first maximum capacity of the first compressor;

allowing the second compressor to operate at the second minimum capacity and the first compressor to operate at the first minimum capacity, if the calculated air conditioning capacity is greater than the first maximum capacity of the first compressor and is less than or equal to a sum of the second minimum capacity of the second compressor and the first minimum capacity of the first compressor;

allowing the second compressor to operate at the second maximum capacity and stopping an operation of the first compressor, if the calculated air conditioning capacity is greater than the sum of the second minimum capacity and the first minimum capacity and is less than or equal to the second maximum capacity of the second compressor;

allowing the second compressor to operate at the second maximum capacity and the first compressor to operate at the first minimum capacity, if the calculated air conditioning capacity is greater than the second maximum capacity and is less than or equal to a sum of the second maximum capacity of the second compressor and the first minimum capacity of the first compressor; and allowing the second compressor to operate at the second maximum capacity and the first compressor to operate at the first maximum capacity, if the calculated air conditioning capacity is greater than the sum of the second maximum capacity and the first minimum capacity of the first compressor.

8. An air conditioning apparatus, comprising:
a first compressor operated at one of a non-zero first capacity and a non-zero second capacity;
a second compressor connected in parallel with the first compressor and operated at one of a non-zero third capacity and a non-zero fourth capacity; and
a control unit to control the first and second compressors such that a total capacity of the first and second compressors is varied in plural stages according to indoor air conditioning loads.

9. The air conditioning apparatus according to claim 8, wherein the first capacity is substantially equal to the third capacity and the fourth capacity is about two times the third capacity.

10. The air conditioning apparatus according to claim 8, wherein:
the first compressor has plural compressing rooms therein and operates at one of the first capacity and the second capacity according to a direction of rotation of the first compressor; and
the second compressor has plural compressing rooms therein and operates at one of the third capacity and the fourth capacity according to a direction of rotation of the second compressor.

11. The air conditioning apparatus according to claim 10, wherein:

the compressing rooms of the first compressor perform compression if the first compressor rotates in a first direction, thereby operating at the second capacity; and one of the compressing rooms of the first compressor performs the compression if the first compressor rotates in a second direction, thereby operating at the first capacity.

12. The air conditioning apparatus according to claim 11, wherein:

the compressing rooms of the second compressor perform compression if the second compressor rotates in a first direction, thereby operating at the fourth capacity; and one of the compressing rooms of the second compressor performs the compression if the second compressor rotates in a second direction, thereby operating at the third capacity.

13. The air conditioning apparatus according to claim 8, further comprising:

an oil equalization device connecting the first compressor with the second compressor so as to supply oil to the first and second compressors according to the indoor air conditioning loads.

14. An air conditioning apparatus, comprising:

a plurality of indoor units; and an outdoor unit connected to the plurality of indoor units, comprising, a first compressor controlled to operate at one of a first capacity and a second capacity;

a second compressor connected in parallel with the first compressor and controlled to operate at one of a third capacity and a fourth capacity; and an outdoor control unit controlling the first and second compressors such that a total capacity of the first and second compressors is controlled in plural stages by setting the capacity of the first compressor at a higher capacity of the first capacity and the second capacity, while not exceeding a total capacity for supply of the indoor air conditioning loads and setting the capacity of the second compressor at a higher capacity of the third capacity and the fourth capacity, while not exceeding a difference between the total capacity for supply of the indoor air conditioning loads and the set capacity of the first compressor.

15. The air conditioning apparatus according to claim 14, wherein the second capacity of the first compressor is substantially equal to the third capacity of the second compressor, and the fourth capacity of the second compressor is about two times or more the third capacity of the second compressor.

16. A method of controlling an air conditioning apparatus, the air conditioning apparatus having a plurality of indoor units connected to an outdoor unit comprising a first compressor operating at one of a first capacity and a second capacity, and a second compressor operating at one of a third capacity and a fourth capacity, the second capacity of the first compressor being substantially equal to the third capacity of the second compressor, and the fourth capacity of the second compressor being about two times or more the third capacity of the second compressor, the method comprising:

calculating an air conditioning capacity according to indoor air conditioning loads; and controlling capacities of the first and second compressors such that a total capacity of the first and second compressors is varied in plural stages according to the calculated air conditioning capacity.

17. The control method of the air conditioning apparatus according to claim 16, wherein controlling capacities further comprises:

stopping operations of the first and second compressors, if the calculated air conditioning capacity is 0;

stopping an operation of the second compressor and allowing the first compressor to operate at the first capacity, if the required air conditioning capacity is greater than 0 and is equal to or less than the first capacity of the first compressor;

stopping an operation of the second compressor and controlling the capacity of the first compressor by determining a duty control signal to correspond to the calculated air conditioning capacity and performing loading and unloading operations in response to the duty control signal so as to operate the first compressor at the first capacity, if the calculated air conditioning capacity is greater than the first capacity of the first compressor and is less than or equal to the second capacity of the first compressor;

operating the second compressor at the third capacity and operating the first compressor at the first capacity, if the calculated air conditioning capacity is greater than the first capacity and is less than or equal to a sum of the third capacity and the first capacity;

operating the second compressor at the fourth capacity and stopping an operation of the first compressor, if the calculated air conditioning capacity is greater than the sum of the third capacity and the first capacity and is equal to or less than the fourth capacity of the second compressor;

operating the second compressor at the fourth capacity and operating the first compressor at the first capacity, if the calculated air conditioning capacity is greater than the fourth capacity and is less than or equal to a sum of the fourth capacity and the first capacity; and operating the second compressor at the fourth capacity and operating the first compressor at the second capacity, if the calculated air conditioning capacity is greater than the sum of the fourth capacity and the first capacity.

18. The control method of the air conditioning apparatus according to claim 16, wherein controlling capacities further comprises:

operating the first and second compressors at the calculated air conditioning capacity by setting the capacity of the first compressor to operate at a higher capacity of the first capacity and the second capacity, while not exceeding the calculated air conditioning capacity, and by adjusting the capacity of the second compressor to operate at a capacity substantially equal to but not exceeding the difference between the calculated air conditioning capacity and the capacity set for the first compressor.

19. The control method of the air conditioning apparatus according to claim 16, wherein controlling capacities further comprises:

setting the capacity of the first compressor to operate at a higher capacity of the first capacity and the second capacity while not exceeding the calculated air conditioning capacity; and adjusting the capacity of the second compressor to operate at the one of the third and fourth capacities substantially equal to but not exceeding a difference between the calculated air conditioning capacity and the capacity of the first compressor in said setting.

20. A controller for controlling an air conditioning apparatus having a first compressor and a second compressor, comprising:

a control unit controlling the first compressor to operate at one of a non-zero minimum capacity and a maximum capacity and the second compressor, which is connected in parallel with the first compressor, to operate at one of a non-zero second minimum capacity and a second maximum capacity, and the control unit controls the first and second compressors by varying a total capacity of the first and second compressors in plural stages according to indoor air conditioning loads.

21. A machine readable storage medium for controlling a computer to operate an air conditioning apparatus having a plurality of indoor units connected to an outdoor unit comprising a first compressor operating at one of a first capacity and a second capacity, and a second compressor operating at one of a third capacity and a fourth capacity, the second capacity of the first compressor being substantially equal to the third capacity of the second compressor, and the fourth capacity of the second compressor being about two times or more the third capacity of the second compressor, the machine readable storage medium storing a program to execute:

calculating an air conditioning capacity according to indoor air conditioning loads; and controlling capacities of the first and second compressors such that a total capacity of the first and second compressors is varied in plural stages according to the calculated air conditioning capacity.

22. An air conditioning apparatus, comprising:

at least three or more compressors connected in parallel and each operated at one of two different non-zero capacities;

a control unit to control the at least three or more compressors such that a total capacity of the at least three or more compressors is varied in plural stages according to indoor air conditioning loads and produces a total capacity operating characteristic which is piecewise linear.

23. An air conditioning apparatus, comprising:

a first compressor controlled to operate at one of a first minimum capacity and a first maximum capacity;

a second compressor connected in parallel with the first compressor and controlled to operate at one of a second minimum capacity and a second maximum capacity; and a control unit controlling the first and second compressors such that a total capacity of the first and second compressors is controlled in multiple stages according to indoor air conditioning loads, wherein each of the first and second compressors has two compressing rooms therein and operates at a maximum capacity if the first and second compressors rotates in a forward direction by performing compression in all of the compressing rooms, and operates at a minimum capacity if the first and second compressors rotates in a reverse direction by performing compression in one of the compressing rooms of each of the first and second compressors.

* * * * *

UNITED STATES PATENT AND TRADEMARK OFFICE
CERTIFICATE OF CORRECTION

PATENT NO. : 6,722,143 B2
DATED : April 20, 2004
INVENTOR(S) : Je-Myoung Moon et al.

It is certified that error appears in the above-identified patent and that said Letters Patent is hereby corrected as shown below:

Title page,
Item [56], References Cited, OTHER PUBLICATIONS, second reference, change "10/305,177" to -- 10/305,117 --.

Signed and Sealed this

Twenty-seventh Day of July, 2004

JON W. DUDAS
*Acting Director of the United States Patent and Trademark Office*